(12) United States Patent
Tanaka

(10) Patent No.: US 11,623,449 B2
(45) Date of Patent: Apr. 11, 2023

(54) PRINTING APPARATUS, SYSTEM, AND SERVER SYSTEM

(71) Applicant: CANON KABUSHIKI KAISHA, Tokyo (JP)

(72) Inventor: Yuya Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/126,219

(22) Filed: Dec. 18, 2020

(65) Prior Publication Data

US 2021/0197603 A1 Jul. 1, 2021

(30) Foreign Application Priority Data

Dec. 27, 2019 (JP) .............................. JP2019-239142

(51) Int. Cl.
*B41J 2/175* (2006.01)
*G06Q 10/08* (2012.01)
*H04N 1/00* (2006.01)
*G06Q 10/087* (2023.01)
*B41L 27/04* (2006.01)

(52) U.S. Cl.
CPC ........ *B41J 2/17503* (2013.01); *G06Q 10/087* (2013.01); *H04N 1/00244* (2013.01); *B41L 27/04* (2013.01)

(58) Field of Classification Search
CPC ............... B41J 2/17503; G06Q 10/087; H04N 1/00244; B41L 27/04
See application file for complete search history.

(56) References Cited

U.S. PATENT DOCUMENTS 10,810,651 B2 * 10/2020 Ohara ................ G06Q 30/0223

FOREIGN PATENT DOCUMENTS

JP 2015-090384 A 5/2015

* cited by examiner

*Primary Examiner* — Geoffrey S Mruk
(74) *Attorney, Agent, or Firm* — Venable LLP

(57) ABSTRACT

An object of the present disclosure is to provide a technique capable of appropriately ordering an ink bottle. One embodiment of the present disclosure is a printing apparatus that includes: an ink tank that stores ink supplied from an ink bottle; and a head to which ink is supplied from the ink tank, and the printing apparatus includes a transmission unit configured to transmit status information in which at least information relating to an ink remaining amount within the ink tank is included to a server and order processing of a new ink bottle is performed based on an ink consumption amount of the ink bottle.

9 Claims, 16 Drawing Sheets

```
                                 600
                                  ⤓
            {
601 ⁓      "serialNumber":"AAAA11111",
602 ⁓      "model":"ABCZ series",
           "inkStatus": [
              {
603 ⁓            "color":"Cyan",
604 ⁓            "model":"ABC-<C>",
605 ⁓            "level":"80"
              },
              {
                 "color":"Black",
                 "model":"ABC-<Bk>",
                 "level":"90"
              },
              {
                 "color":"Yellow",
                 "model":"ABC-<Y>",
                 "level":"90"
              },
              {
                 "color":"Magenta",
                 "model":"ABC-<M>",
                 "level":"70"
              }
           ]
        }
```

FIG.6

| PRINTER | TYPE INFORMATION ON CONSUMABLE ITEM | ORDER OF BLACK | ORDER OF YELLOW | ORDER OF CYAN | ORDER OF MAGENTA |
|---|---|---|---|---|---|
| AAAA11111 | INK BOTTLE | OK | OK | OK | OK |
| BBBB22222 | INK BOTTLE | OK | OK | OK | OK |

| PRINTER | MODEL NUMBER OF BLACK | MODEL NUMBER OF YELLOW | MODEL NUMBER OF CYAN | MODEL NUMBER OF MAGENTA |
|---|---|---|---|---|
| AAAA11111 | ABC-<Bk>L | ABC-<Y>L | ABC-<C>L | ABC-<M>L |
| BBBB22222 | ABC-<Bk>M | ABC-<Y>M | ABC-<C>M | ABC-<M>M |

| PRINTER | CONSUMPTION AMOUNT OF BLACK | CONSUMPTION AMOUNT OF YELLOW | CONSUMPTION AMOUNT OF CYAN | CONSUMPTION AMOUNT OF MAGENTA |
|---|---|---|---|---|
| AAAA11111 | 0 | 0 | 0 | 0 |
| BBBB22222 | 150 | 30 | 40 | 20 |

| PRINTER | REMAINING AMOUNT OF BLACK | REMAINING AMOUNT OF YELLOW | REMAINING AMOUNT OF CYAN | REMAINING AMOUNT OF MAGENTA |
|---|---|---|---|---|
| AAAA11111 | 100 | 100 | 100 | 100 |
| BBBB22222 | 50 | 70 | 60 | 80 |

| MODEL NUMBER | ORDER THRESHOLD VALUE | SIZE INFORMATION |
|---|---|---|
| ABC-<Bk>L | 270 | 500 |
| ABC-<C>L | 270 | 500 |
| ABC-<Y>L | 270 | 500 |
| ABC-<M>L | 270 | 500 |
| ABC-<Bk>M | 170 | 300 |
| ABC-<C>M | 170 | 300 |
| ABC-<Y>M | 170 | 300 |
| ABC-<M>M | 170 | 300 |

FIG.9E

PRINTING APPARATUS, SYSTEM, AND SERVER SYSTEM

BACKGROUND OF THE DISCLOSURE

Field of the Disclosure

The present disclosure relates to a technique to order a consumable item of a printing apparatus.

Description of the Related Art

In recent years, a printing apparatus has appeared that is capable of communicating with a WEB server by connecting to the internet. Japanese Patent Laid-Open No. 2015-90384 has proposed a consumable item order system that orders a consumable item in a case where a printing apparatus detects the remaining amount state of the consumable item with the printing apparatus and the remaining amount of the consumable item becomes less than or equal to a threshold value.

SUMMARY OF THE DISCLOSURE

However, Japanese Patent Laid-Open No. 2015-90384 does not suppose a printing apparatus using ink bottles in which ink injected from an ink bottle for ink replenishment is temporarily stored in an ink tank.

Consequently, in view of the above-described problem, an object of one embodiment of the present disclosure is to provide a technique capable of appropriately ordering an ink bottle.

One embodiment of the present disclosure is a printing apparatus including: an ink tank that stores ink supplied from an ink bottle; and a head to which ink is supplied from the ink tank, and the printing apparatus includes a transmission unit configured to transmit status information in which at least information relating to an ink remaining amount within the ink tank is included to a server and order processing of a new ink bottle is performed based on an ink consumption amount of the ink bottle.

Further features of the present disclosure will become apparent from the following description of exemplary embodiments with reference to the attached drawings.

BRIEF DESCRIPTION OF THE DRAWINGS

FIG. 6 is a diagram showing printer status information;

FIG. 9A to FIG. 9E are various tables that are stored in a database of the management server in the first embodiment;

DESCRIPTION OF THE EMBODIMENTS

In the following, with reference to the attached drawings, preferred embodiments of the present disclosure are explained in detail. The following embodiments are not intended to limit the present disclosure according to the scope of the claims and all combinations of features explained in the present embodiments are not necessarily indispensable to the solution of the present disclosure.

First Embodiment

<Configuration of Consumable Item Order System>

Figure 1:
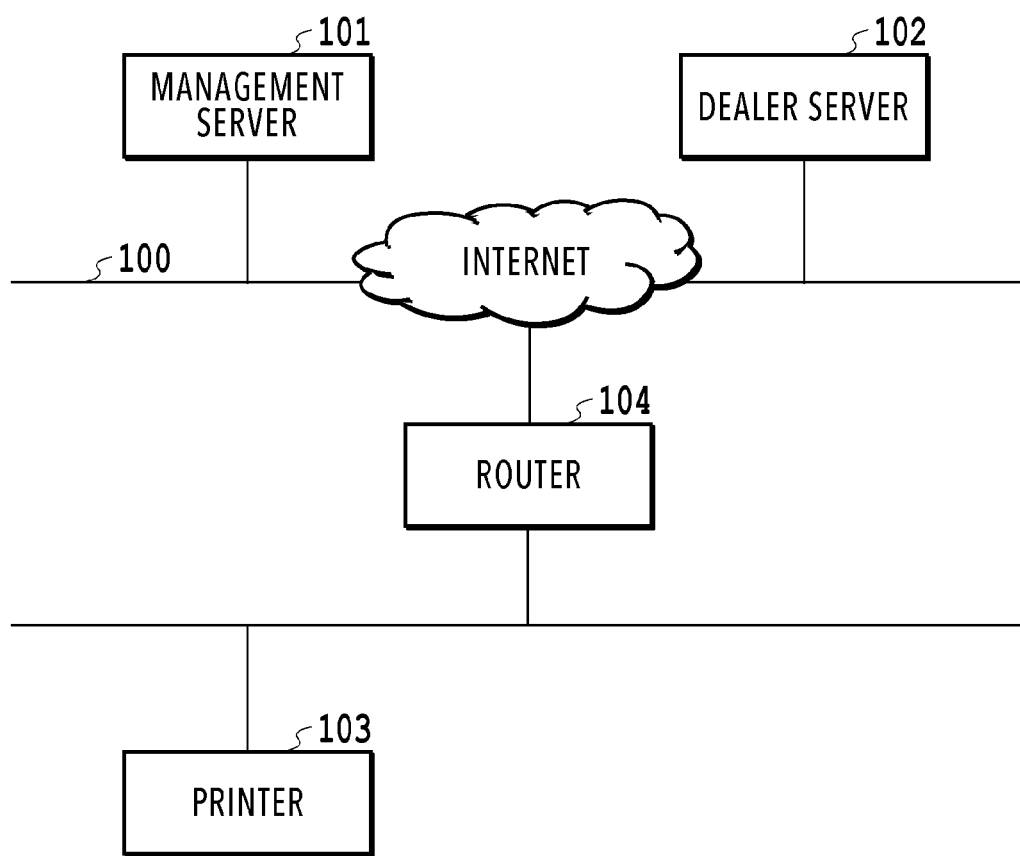
FIG. 1 is a diagram showing a configuration of a consumable item order system in a first embodiment.

In the following, a configuration of a consumable item order system in the present embodiment is explained by using FIG. 1. FIG. 1 is a diagram showing an example of the configuration of the consumable item order system in the present embodiment. As shown in FIG. 1, the consumable item order system in the present embodiment has a management server 101, a dealer server 102, and a printer 103, which is a printing apparatus. In the present embodiment, the consumable item order system is a system having a printing apparatus and a server system comprising one or more servers.

The management server 101 and the dealer server 102 are connected to an internet 100, respectively. It is possible for the printer 103 to connect to the internet via a router 104. It is possible for the management server 101 to manage information transmitted from the printer 103 and provide information transmitted from the printer 103 to the dealer server 102 via the internet 100. For each communication, control through HTTP, XMPP or the like is performed. The protocol is not limited to those and another protocol may be used.

<Configuration of Server>

Figure 2:
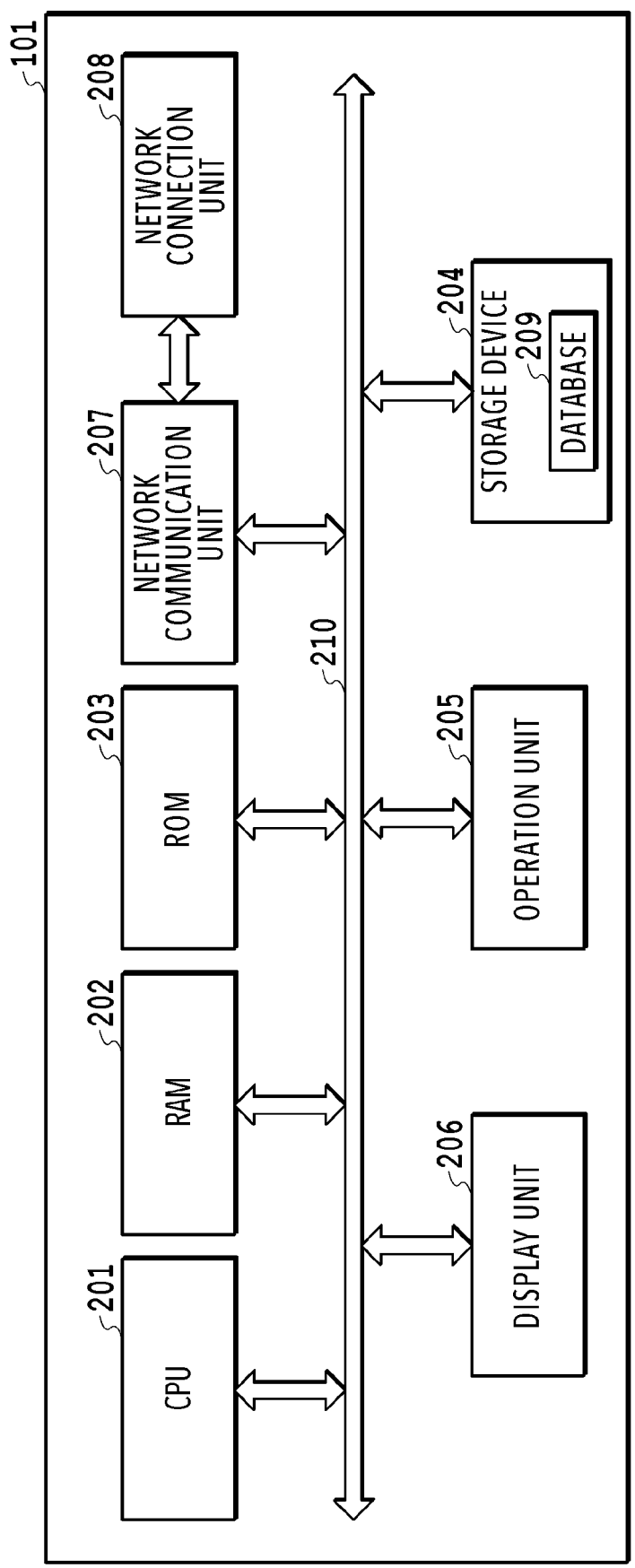
FIG. 2 is a block diagram showing a hardware configuration of a server in the first embodiment.

In the following, the configuration of the management server 101 in the present embodiment is explained by using FIG. 2. FIG. 2 is a block diagram showing an example of the hardware configuration of the management server 101. The management server 101 has a CPU 201, a RAM 202, a ROM 203, a storage device 204, an operation unit 205, a display unit 206, a network communication unit 207, and a network connection unit 208.

The CPU 201 is a central processing unit for controlling each unit of the management server 101. The RAM 202 plays a role of a work memory that is necessary at the time the CPU 201 executing a program. The ROM 203 is a read-only memory for storing a boot program necessary for system activation. The storage device 204 is a device for storing programs executed by the CPU 201, a database 209, and various kinds of information and for example, is a non-volatile storage device, such as a magnetic disk and a flash memory. The operation unit 205 includes a keyboard, a mouse and the like for a user to perform various input operations. The display unit 206 includes, for example, an LCD and on which various kinds of information are displayed and presented to a user. The network communication unit 207 is connected with a network, such as the internet 100, via the network connection unit 208 and performs various kinds of communication. Each unit described above is connected to one another via a bus 210 and is capable of transmitting and receiving data to and from one another.

It is assumed that the dealer server 102 has the same hardware configuration as that of the management server 101 and explanation thereof is omitted. However, it may also be possible for the dealer server 102 to have a hardware configuration different from that of the management server 101. Further, in FIG. 2, the dealer server 102 and the management server 101 include one server, respectively, but it may also be possible to configure the dealer server 102 and the management server 101 as a server system including one or more servers, respectively.

Figure 3:
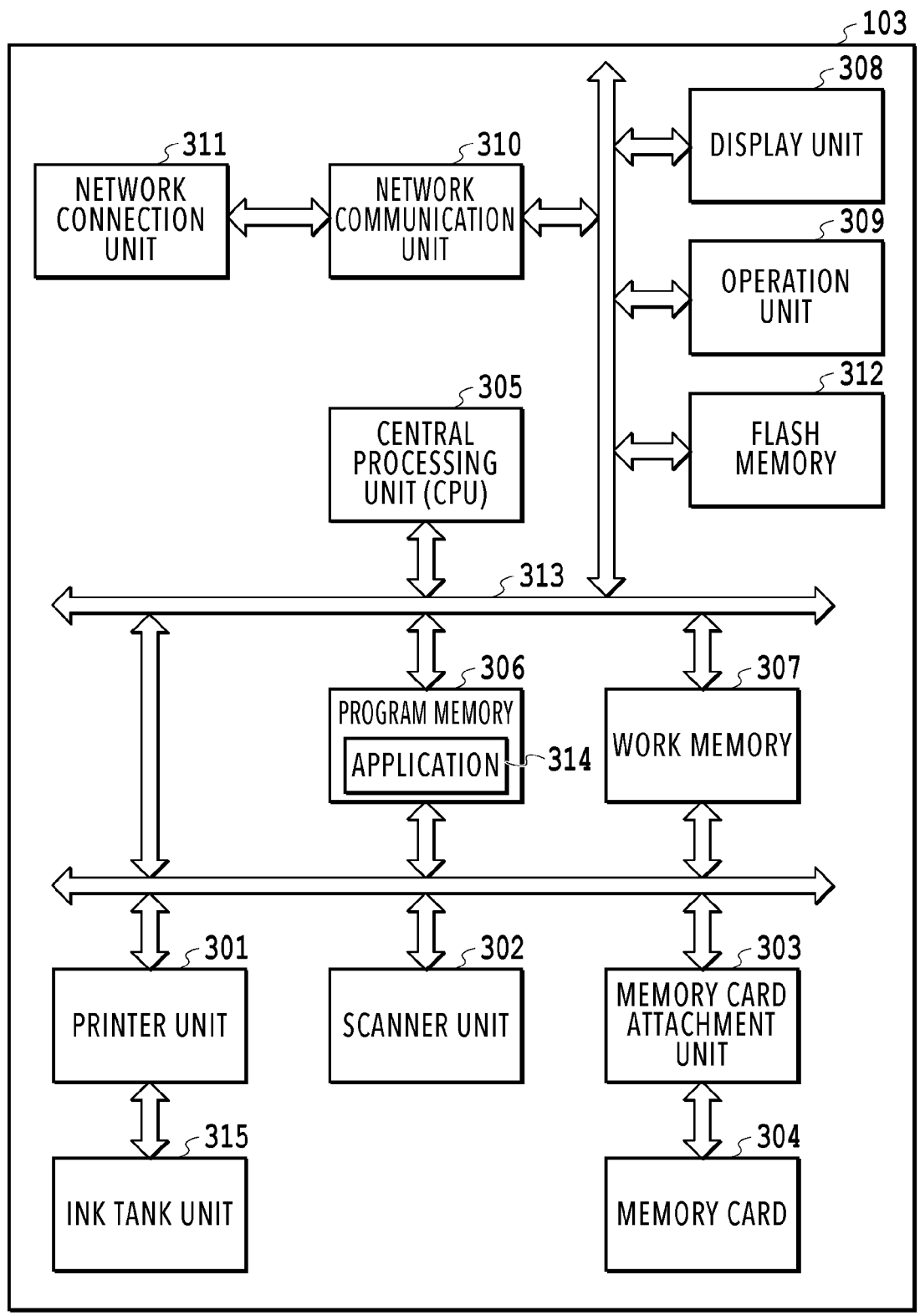
FIG. 3 is a block diagram showing a hardware configuration of a printer in the first embodiment.

In the following, the configuration of the printer 103 in the present embodiment is explained by using FIG. 3. FIG. 3 is a block diagram showing an example of the hardware configuration of the printer 103. The printer unit 103 has a printer unit 301, a scanner unit 302, a memory card attachment unit 303, a memory card 304, and an ink tank unit 315. Further, the printer 103 has a CPU 305, a program memory 306, a work memory 307, a display unit 308, an operation unit 309, a network communication unit 310, a network connection unit 311, and a flash memory 312. In the present embodiment, explanation is given by taking the printer 103, which is a multifunction printer, as an example of the image printing apparatus, but the image printing apparatus to which the present embodiment can be applied is not limited to a printer. As the image printing apparatus, it may also be possible to use a copy machine, a facsimile or the like, or to use a printer not mounting the scanner function.

In the printer 103, the print function is implemented by the printer unit 301, the scanner function by the scanner unit 302, and the storage function by the memory card attachment unit 303 and the memory card 304. In the ink tank unit 315, ink is stored. The ink tank unit 315 comprises an ink injection port and it is possible to replenish ink from an ink bottle that is attached to the printer unit 103 detachably and in which ink for consumable item replenishment is stored. The printer unit 301 has an ink jet head and ink is supplied to the ink jet head via a tube from the ink tank unit 315. Further, the printer unit 301 prints an image on a printing medium, such as a print sheet, by the ink jet method based on image data received from the outside, image data stored in the memory card 304 or the like. Further, the printer unit 301 also manages ink information including ink remaining amount information and sheet information including information on the number of loaded sheets.

The scanner unit 302 optically reads a document that is set on a document table (not shown schematically) and converts read data into electronic data and further, transmits image data converted into a specified file format to an external apparatus via a network, stores the image data in a storage area (not shown schematically), such as an HDD, and so on. Further, the copy function is implemented by the scanner unit 302 reading a document placed on the document table and transferring the generated image data to the printer unit 301 and the printer unit 301 printing an image on a printing medium based on the image data. In the memory card 304 attached to the memory card attachment unit 303, various kinds of file data are stored. It is possible to edit the file data by reading it from an external apparatus via a network. Further, it is also possible to store file data in the memory card 304 in accordance with instructions from an external apparatus.

The CPU 305 is a central processing unit for controlling each unit within the printer unit 103. The program memory 306 includes a ROM and the like and in the program memory 306, various program codes and an application 314 for communicating with the management server 101 are stored. The module of the application 314 generates printer status information, to be described later. The work memory 307 includes a RAM and the like. In the work memory 307, image data or the like is stored temporarily at the time of execution of each service and buffering is performed by using the work memory 307. The display unit 308 includes, for example, an LCD and various kinds of information are displayed thereon. The operation unit 309 includes switches and the like for a user to perform various input operations. The network communication unit 310 connects with the router 104 via the network connection unit 311. That is, the network communication unit 310 connects to a network, such as the internet 100, via the network connection unit 311 and performs various kinds of communication. In the various kinds of communication, control through HTTP, XMPP or the like is performed. The protocols are not limited to those and another protocol may be used. The flash memory 312 is a nonvolatile memory for storing image data and the like received by the network communication unit 310. Each of the units described above is connected to one another by a bus 313 and capable of performing transmission and reception of data with one another.

<Joining in Consumable Item Order Service>

Figure 4:
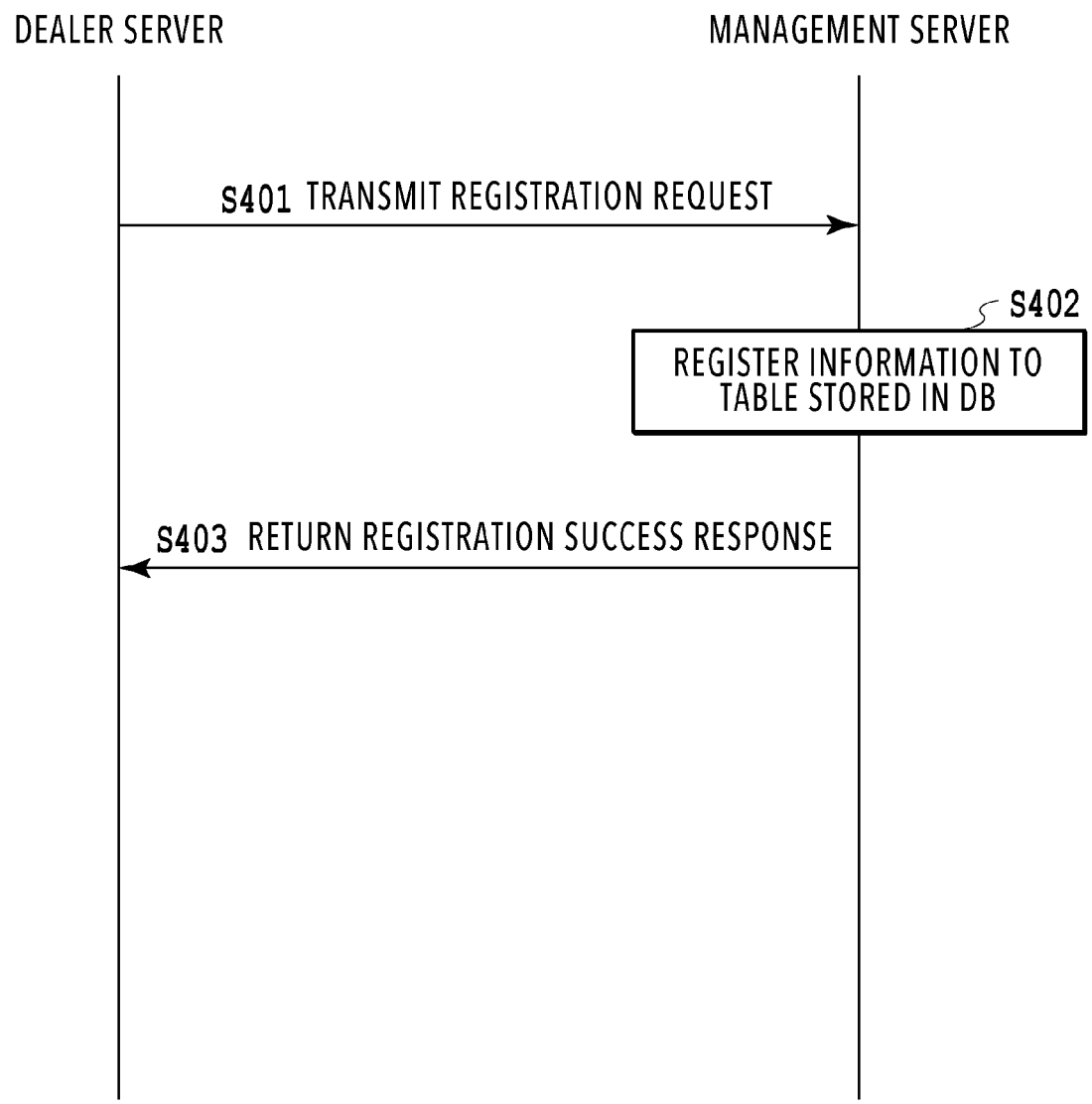
FIG. 4 is a sequence diagram at the time of joining in a consumable item order service in the first embodiment.

In the following, the processing from joining in the consumable item order service until the consumable item order is explained by using FIG. 4 and the like. FIG. 4 is a sequence diagram showing an example of processing performed by the management server 101 and the dealer server 102 at the time of joining in the consumable item order service. The series of processing shown by the sequence in FIG. 4 is performed by each CPU of the management server 101 and the dealer server 102 loading program codes stored in the disk device or the like onto the RAM and executing the program codes. Alternatively, part or all of the functions at the steps in FIG. 4 may be implemented by hardware, such as an ASIC or an electronic circuit.

Upon receipt of an application for joining in the consumable item order service from a user, the dealer server 102 transmits a registration request to the management server 101 at step S401. In the registration request that is transmitted at this step, various kinds of information on the serial number for identifying the printer 103, the consumable item type, the ink bottle model number and the like are included. The information on the consumable item type indicates, for example, in a case where the consumable item is ink, whether ink cartridges are used or ink bottles are used. Here, as the information specifying the printer, the serial number is taken as an example, but it may also be possible to use another piece of information, such as a MAC address. In the following, "Step S-" is abbreviated to "S-".

At S402, the management server 101 registers the information acquired at S401 to each table stored in the database 209.

FIG. 9A to FIG. 9E are each a diagram showing an example of various tables stored in the database 209 of the management server 101. FIG. 9A is a diagram showing an example of a printer management table 901. The management server 101 associates the information on the serial number of the printer 103 and the information on the consumable item type with each other, both included in the registration request received from the dealer server 102, and stores them in the printer management table 901. Further, in the printer management table 901, information (referred to as order possible/impossible information) indicating whether or not it is possible to order the ink bottle for each color is stored in association with each serial number. In a state where an order is not placed yet to the dealer server 102 and it is possible to place an order, "OK" is registered as a value indicating that an order is possible. On the other hand, in a state where an order has already been placed to the dealer server 102 and it is not possible to place an order, "NG" is registered as a value indicating that an order is not possible. As the initial value at the time of service registration, "OK" is registered.

FIG. 9B is a diagram showing an example of an ink model number table 902. The management server 101 associates the serial number of the printer 103 and the ink bottle model number of each color with each other, both included in the registration request received from the dealer server 102, and stores them in the ink model number table 902.

FIG. 9C is a diagram showing an example of an ink bottle consumption amount table 903. The management server 101 associates the serial number of the printer 103 and the ink bottle ink consumption amount of each color with each other, both included in the registration request received from the dealer server, and stores them in the ink bottle consumption amount table 903. As the initial value at the time of service registration, a value of 0 is registered.

FIG. 9D is a diagram showing an example of an ink tank remaining amount table 904. The management server 101 associates the serial number of the printer 103 and the ink remaining amount within the ink tank of each color with each other, both included in the registration request received from the dealer server, and stores them in the ink tank remaining amount table 904. The ink remaining amount within the ink tank is information included in printer status information 600, to be described later, and as the initial value at the time of service registration, a value of 100 is registered.

FIG. 9E is a diagram showing an example of an ink bottle master table 905. The management server 101 stores in advance the ink bottle master table 905 as the database 209 in the storage device 204, which is for associating the ink bottle model number, an order threshold value 906, and size information 907 with one another and storing them. Each value that is stored in the item of size information 907 is a value in a case where the maximum capacity (in the present embodiment, this is assumed to be 100) that can be injected into the ink tank of the printer 103 is taken as a reference. For example, in a case where it is possible to inject the maximum capacity into one ink tank five times from the state where the ink tank is empty by one ink bottle, the size value of the ink bottle is 500. Like the size information 907, each value that is stored in the item of the order threshold value 906 is a value in a case where the maximum capacity of 100 that can be injected into the ink tank of the printer 103 is taken as a reference and the value is used to specify timing at which the management server 101 places an order to the dealer server 102.

Explanation is returned to FIG. 4. At S403, the management server 101 returns a response indicating success in registration (referred to as registration success response) to the dealer server 102 in response to the registration request received at S401.

<Transmission Processing of Consumable Item Information by Printer>

Figure 5:
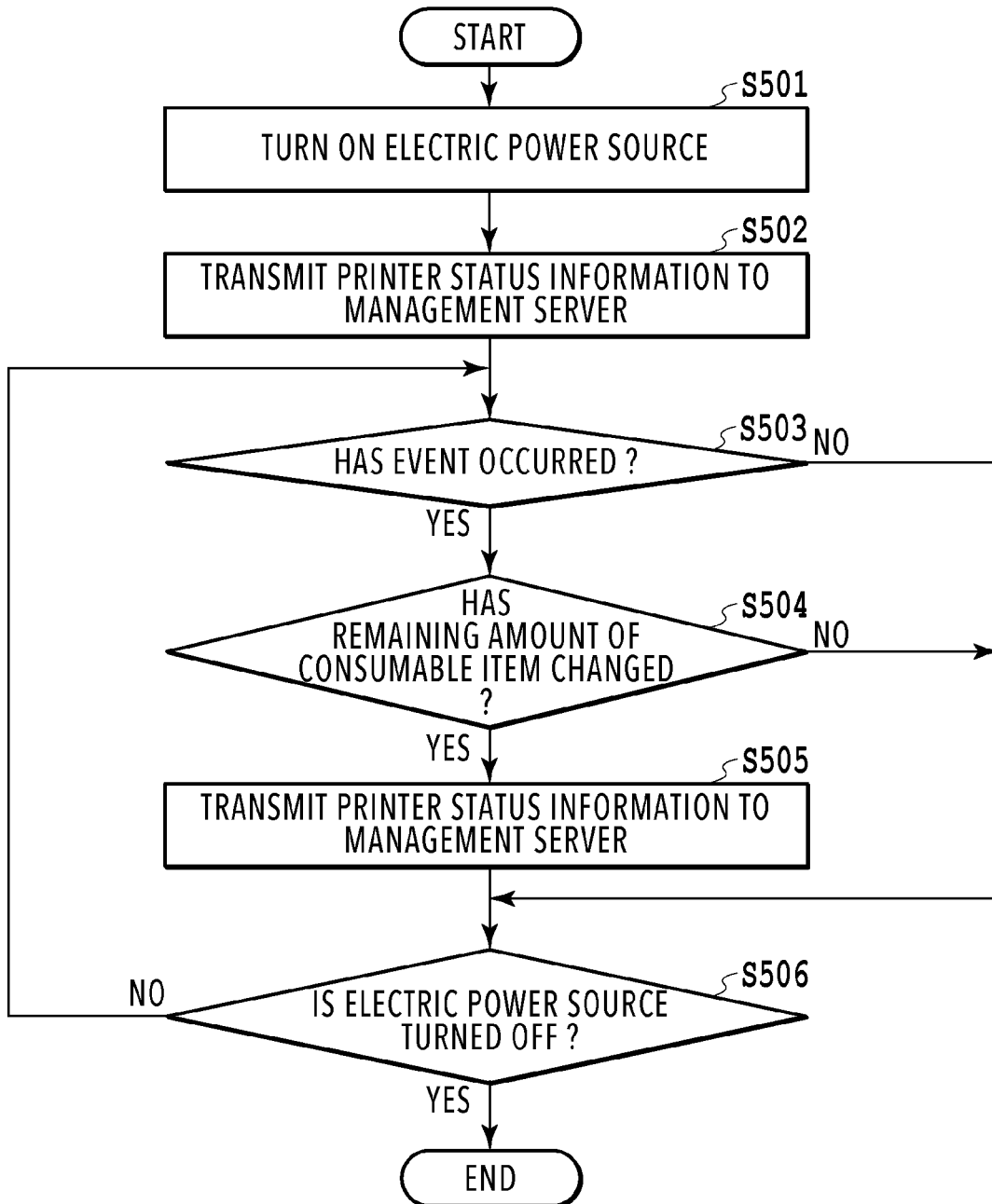
FIG. 5 is a flowchart of transmission processing of printer status information in the first embodiment.

In the following, processing for the printer 103 to transmit consumable item information to the management server 101 is explained by using FIG. 5. FIG. 5 is a flowchart showing a flow of the processing for the printer 103 to transmit printer status information in which the consumable item information is included to the management server 101. The series of processing shown by the flowchart in FIG. 5 is performed by the CPU 305 of the printer 103 loading program codes stored in a disk device or the like onto the RAM and executing the program codes. It is assumed that the printer 103 is in the state where the electric power source is off before the series of processing shown by the flowchart in FIG. 5 is started.

In a case of detecting pressing down of an electric power source button, at S501, the CPU 305 brings the printer 103 from the state where the electric power source is off into the state where the electric power source is on.

At S502, the CPU 305 transmits the printer status information 600 indicating the situation of the printer 103 to the management server 101. FIG. 6 is a diagram showing an example of the printer status information. In the printer status information 600, a printer serial number 601, a model name 602, a color 603 for each color, an ink bottle model number 604, and an ink remaining amount 605 within the ink tank, which is derived by dot count or sensor detection, are included.

At S503, the CPU 305 determines whether an event has occurred. For example, in a case where some operation is performed for the printer 103, such as a case where printing or copying is performed and a case where the cover of the printer 103 is opened, an event occurs. In a case where the determination results at this step are affirmative, the processing advances to S504. On the other hand, in a case where the determination results at this step are negative, the processing advances to S506.

At S504, the CPU 305 determines whether the remaining amount of the consumable item (in the present embodiment, ink within the ink tank mounted on the printer 103) has changed. In a case where the determination results at this step are affirmative, the processing advances to S505. On the other hand, in a case where the determination results at this step are negative, the processing advances to S506.

At S505, the CPU 305 transmits the printer status information 600 to the management server 101.

At S506, the CPU 305 determines whether the electric power source of the printer 103 is turned off. In a case where the determination results at this step are affirmative, the series of processing is terminated. On the other hand, in a case where the determination results at this step are negative, the processing returns to S503.

As explained above, in the present embodiment, at both the timing at which the electric power source is turned on and the timing at which the remaining amount of ink changes because printing or copying is performed, the CPU 305 of the printer 103 transmits the printer status information 600 to the management server 101.

FIG. 10A to FIG. 10E are each a schematic diagram showing an ink replenishment situation in the ink tank and the ink bottle, respectively. Each of symbols 1001, 1003, 1005, 1007, and 1009 in FIG. 10A to FIG. 10E indicates each state (specifically, ink replenishment situation) of the same ink tank. Each of symbols 1002, 1004, 1006, 1008, and 1010 indicates each state (specifically, ink replenishment situation) of the same ink bottle. It is assumed that the ink bottle ink consumption amount in the present embodiment is the amount of ink consumed by, for example, printing or copying, in the printer 103.

Figure 10A:
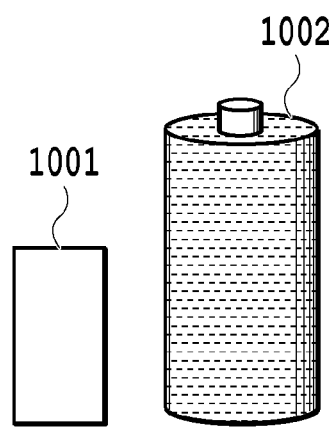
FIG. 10A to FIG. 10E are each a schematic diagram showing an ink replenishment situation in an ink tank and in an ink bottle.

FIG. 10A shows a state of the ink tank and the ink bottle at the time of shipment of the printer 103. Specifically, the ink tank 1001 indicates that the ink tank is in the empty state and the ink bottle 1002 indicates that the ink bottle is in the ink full state. At this time, the consumption amount of the ink bottle is 0.

Figure 10B:
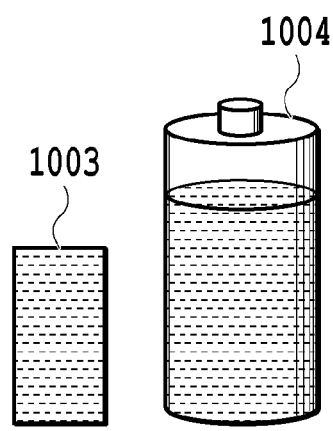

FIG. 10B shows a state where the ink tank is replenished once with the ink within the ink bottle from the state in FIG. 10A. Specifically, the ink tank 1003 indicates that the ink tank is in the ink full state and the ink bottle 1004 indicates that the ink bottle is no longer in the ink full state. At this time also, the ink bottle ink consumption amount is 0 because the ink is not consumed by printing, copying or the like.

Figure 10C:
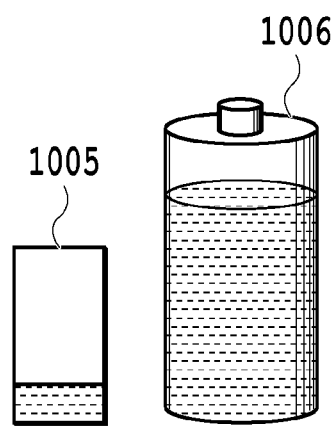

FIG. 10C shows a state where the ink within the ink tank is consumed from the state in FIG. 10B. At this time, in a case where it is assumed that the capacity of the ink tank 1005 is 100 and the ink remaining amount is 10, the ink bottle ink consumption amount is 90 (=100-10).

Figure 10D:
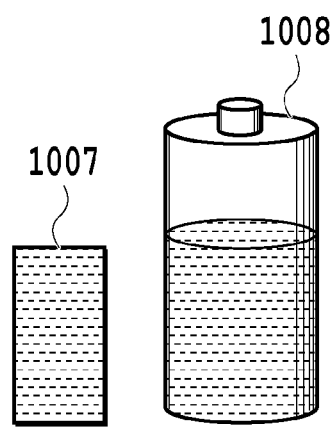

FIG. 10D shows a state where the ink tank is replenished once again (twice in total) with the ink within the ink bottle from the state in FIG. 10C. The ink tank 1007 indicates that the ink tank is in the ink full state. At this time, the ink bottle ink consumption amount does not change and remains 90.

Figure 10E:
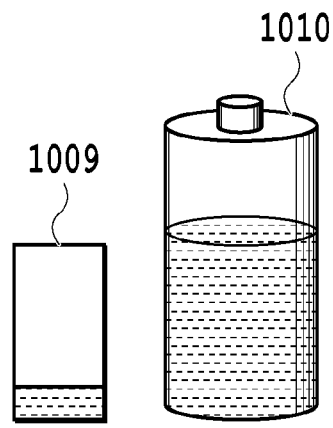

FIG. 10E shows a state where the ink within the ink tank is consumed from the state in FIG. 10D. At this time, in a case where it is assumed that the capacity of the ink tank 1009 is 100 and the ink remaining amount is 10, the ink bottle ink consumption amount is 180 (=90+(100−10)).

<Consumable Item Order Processing by Management Server>

Figure 7:
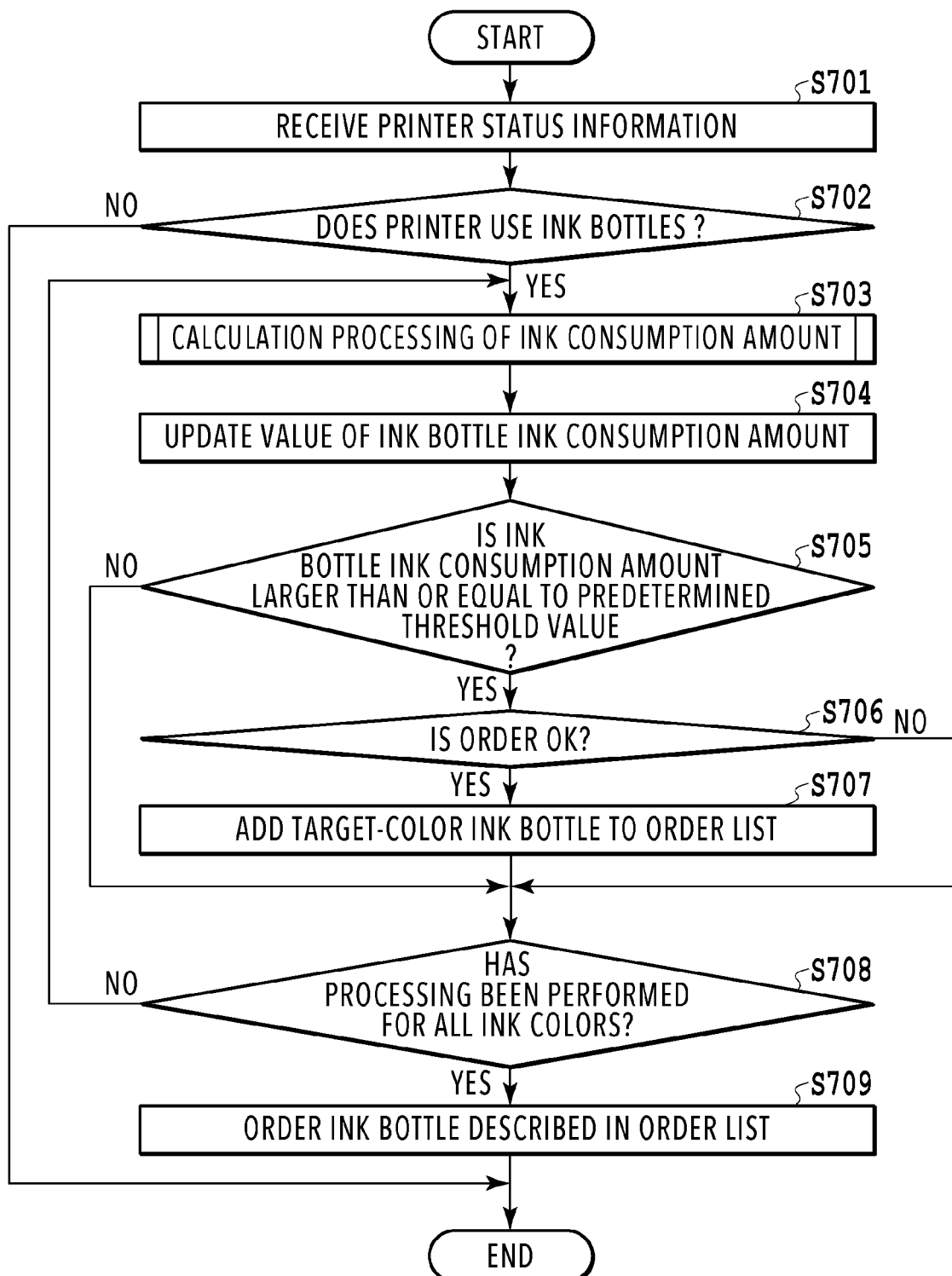
FIG. 7 is a flowchart of order processing of a consumable item for a dealer server by a management server in the first embodiment.

In the following, consumable item order processing for the dealer server 102 by the management server 101 in the present embodiment is explained by using FIG. 7. FIG. 7 is a flowchart showing a flow until the management server 101 gives an ink bottle order notification to the dealer server 102. The processing at each step in FIG. 7 is performed by the CPU 201 of the management server 101 loading a program code stored in the ROM 203 or the storage device 204 onto the RAM 202 and executing the program code.

At S701, the management server 101 receives the printer status information 600 transmitted by the printer 103.

At S702, the CPU 201 determines whether the type of the consumable item used in the printer 103 is the ink bottle, in other words, whether the printer 103 is a printer using ink bottles. Specifically, the CPU 201 searches the printer management table 901 by using the serial number 601 of the printer 103 included in the printer status information 600 acquired at S701 and determines whether the value of the type information on the consumable item corresponding to the printer is "ink bottle".

At S703, the CPU 201 performs calculation processing of an ink bottle ink consumption amount. The calculation processing of an ink consumption amount at this step will be described later (see FIG. 8).

At S704, the CPU 201 updates the value of the ink consumption amount of the target printer and the target color in the ink bottle consumption amount table 903 to the value calculated at S703.

At S705, the CPU 201 acquires model number information on the determination-target-color ink bottle by searching the ink model number table 902 by using the serial number 601 of the printer 103. Next, the CPU 201 acquires the value of the order threshold value 906 corresponding to the determination-target-color ink bottle by searching the ink bottle master table 905 by using the acquired ink bottle model number information and determines whether the value of the ink consumption amount updated at S704 is larger than or equal to the acquired value. In a case where the determination results at this step are affirmative, the processing advances to S706. On the other hand, in a case where the determination results at this step are negative, the processing advances to S708.

At S706, the CPU 201 determines whether it is possible to order the target-color ink bottle based on the ink bottle order situation. Specifically, the CPU 201 refers to the printer management table 901 and determines whether the value for the target color is "OK". In a case where the determination results at this step are affirmative, the processing advances to S707. On the other hand, in a case where the determination results at this step are negative, the processing advances to S708.

At S707, the CPU 201 adds the target-color ink bottle to the order list.

At S708, the CPU 201 determines whether the ink bottle order determination processing and the ink bottle order processing in a case where this is necessary have been performed (in other words, whether the processing at S703 to S707 has been performed) for all the colors of the ink tanks mounted on the printer 103. In a case where the determination results at this step are affirmative, the processing advances to S709. On the other hand, in a case where the determination results at this step are negative (in a case where there is an unprocessed color), the processing returns to S703 and the processing at S703 to S707 is repeated until the processing of all the ink colors is completed.

At S709, the CPU 201 performs processing to place an order for the ink bottle described in the order list to the dealer shop. Specifically, the CPU 201 notifies the dealer server 102 of combination information on the ink color and the ink bottle model number described in the order list. In the order processing, it may also be possible to ask a user of the printer 103 whether to place an order by an electronic mail or the like before giving a notification to the dealer server 102. Then, in a case where a user permits the order, it may be possible to notify the dealer server 102 of the order. In the present disclosure, the order processing is represented so as to include the aspect such as this in which a user is asked once whether or not the order is possible. After giving an order notification, the CPU 201 updates the order possible/impossible information on the color in the printer management table 901, which corresponds to the ordered ink bottle, to a value "NG" indicating a state where it is not possible to place an order because the order has already been placed.

<Calculation Processing of Ink Consumption Amount>

Figure 8:
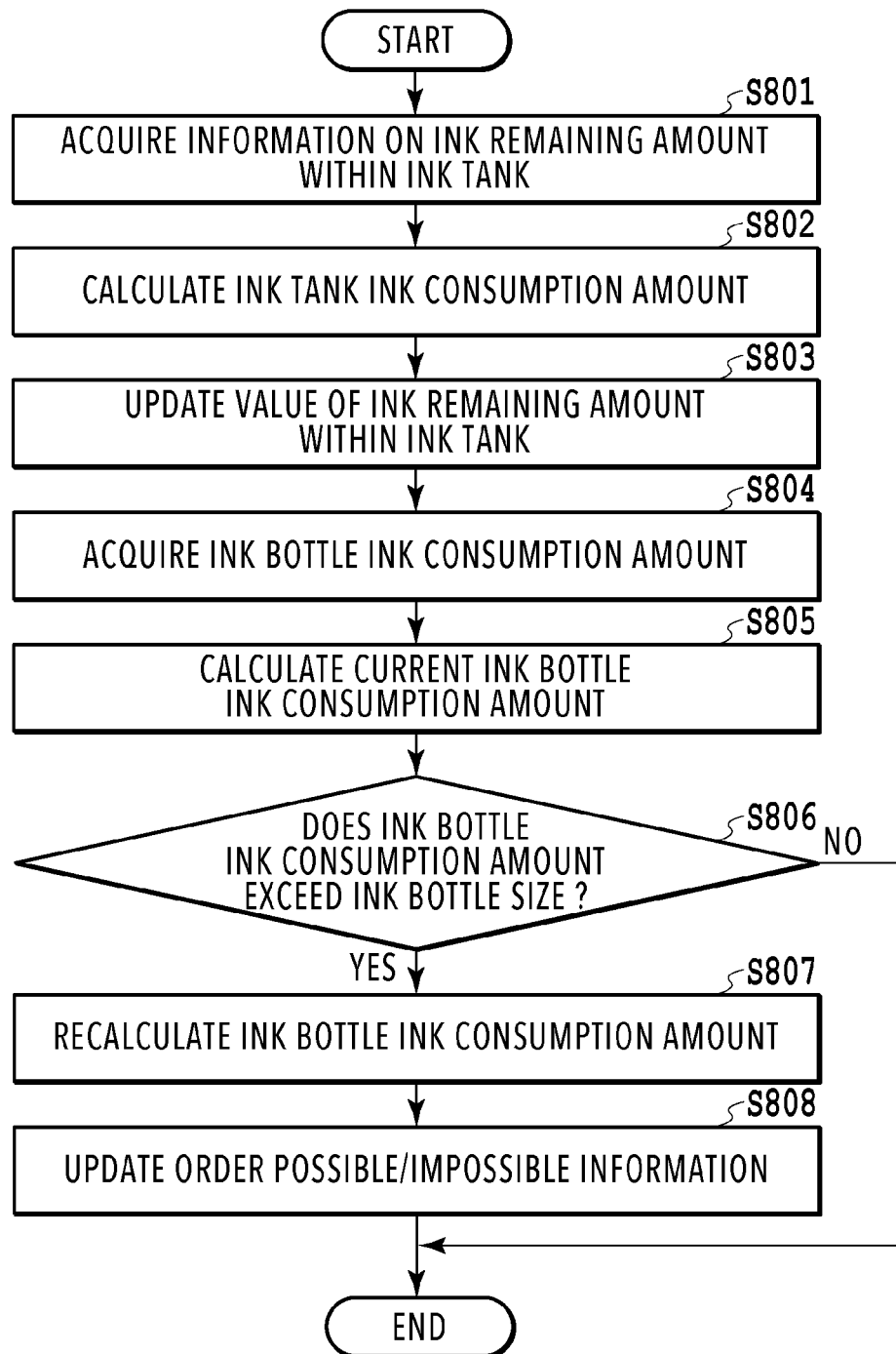
FIG. 8 is a detailed flowchart of calculation processing of an ink consumption amount.

In the following, the calculation processing of an ink consumption amount at S703 in FIG. 7 is explained by using FIG. 8. FIG. 8 is a detailed flowchart of the calculation processing of an ink consumption amount. The processing at each step in FIG. 8 is performed by the CPU 201 of the management server 101 loading a program code stored in the ROM 203 or the storage device 204 onto the RAM 202 and executing the program code.

At S801, the CPU 201 acquires information on an ink remaining amount within the ink tank corresponding to the target color by searching the ink tank remaining amount table 904 by using the serial number 601 of the printer 103.

At S802, the CPU 201 calculates an ink tank ink consumption amount based on the information on the ink remaining amount within the ink tank acquired at S801 and the current ink remaining amount 605 within the ink tank included in the printer status information received at S701. Specifically, the CPU 201 finds the difference between the ink remaining amount of the ink tank at the time of the previous registration and the current ink remaining amount of the ink tank as the ink tank ink consumption amount. For example, in a case where the ink remaining amount indicated by the information on the ink remaining amount within the ink tank acquired at S801 is 100 and the ink remaining amount indicated by the ink remaining amount 605 within the ink tank included in the printer status information acquired at S701 is 90, the ink tank ink consumption amount is 10.

At S803, the CPU 201 updates the value of the ink remaining amount within the target-color ink tank in the ink tank remaining amount table 904 to the value of the ink remaining amount 605 within the ink tank acquired at S701.

At S804, the CPU 201 acquires the ink consumption amount of the target-color ink bottle from the ink bottle consumption amount table 903 by searching the ink consumption amount table 903 by using the serial number 601 of the printer 103.

At S805, the CPU 201 calculates the current ink consumption amount of the ink bottle by adding the ink tank ink consumption amount found at S802 to the ink bottle ink consumption amount acquired at S804. For example, in a case where the ink bottle ink consumption amount found at S804 is 0 and the ink tank ink consumption amount found at S802 is 10, the current ink consumption amount of the ink bottle is 10.

At S806, the CPU 201 acquires the model number information on the target-color ink bottle by searching the ink model number table 902 using the serial number 601 of the printer 103. Next, the CPU 201 acquires the size value of the ink bottle corresponding to the model number by searching the ink bottle master table 905 using the acquired model number information on the ink bottle. Next, the CPU 201 determines whether the (current) ink consumption amount of the ink bottle calculated at S805 exceeds the size value acquired by referring to the ink bottle master table 905. In a case where the determination results at this step are affirmative, the processing advances to S807. On the other hand, in a case where the determination results at this step are negative, the series of processing is terminated.

At S807, the CPU 201 calculates the ink bottle ink consumption amount again (recalculation of ink bottle ink consumption amount). In detail, the CPU 201 performs recalculation that takes a value obtained by subtracting the amount corresponding to the size of the ink bottle from the ink bottle ink consumption amount calculated at S805 as the ink bottle ink consumption amount. For example, in a case where the ink bottle ink consumption amount found at S805 is 510 and the size value of the ink bottle is 500, the ink bottle ink consumption amount after the recalculation is 10.

At S808, the CPU 201 updates the order possible/impossible information on the consumable item registered in the printer management table 901. Specifically, the CPU 201 updates the order possible/impossible information on the target color in the printer management table 901 to "OK" indicating the order possible state.

<Effects and the Like of the Present Embodiment>

According to the present embodiment, it is made possible to order an ink bottle at appropriate timing (that is, at timing at which the ink bottle ink remaining amount becomes small) irrespective of the ink remaining amount within the ink tank mounted on the printer 103.

In the example described previously, the management server 101 includes one information processing apparatus. However, the present embodiment is not limited to the aspect such as this and the management server 101 may include a plurality of information processing apparatuses. That is, it may also be possible for a plurality of information processing apparatuses to implement the function of the management server 101 by performing distributed processing.

Further, in the example described previously, the management server 101 calculates the ink bottle ink consumption amount, but the present embodiment is not limited to the aspect such as this. For example, an aspect may be accepted in which the printer 103 calculates the ink bottle ink consumption amount and information on the calculated ink consumption amount is transmitted to the management server 101.

Furthermore, it is possible to easily derive the ink bottle ink remaining amount information based on the ink bottle ink consumption amount, and therefore, it may also be possible for the management server 101 to perform the processing to determine whether or not an order is possible based on this ink remaining amount information.

Second Embodiment

In the present embodiment, an aspect is explained in which it is made possible for the side of a printer user to set an ink bottle remaining amount level and the ink bottle ink consumption amount managed by the management server 101 is updated. In the present embodiment, explanation of the contents in common to those of the first embodiment is omitted appropriately and points different from those of the first embodiment are explained mainly.

<GUI>

Figure 11:
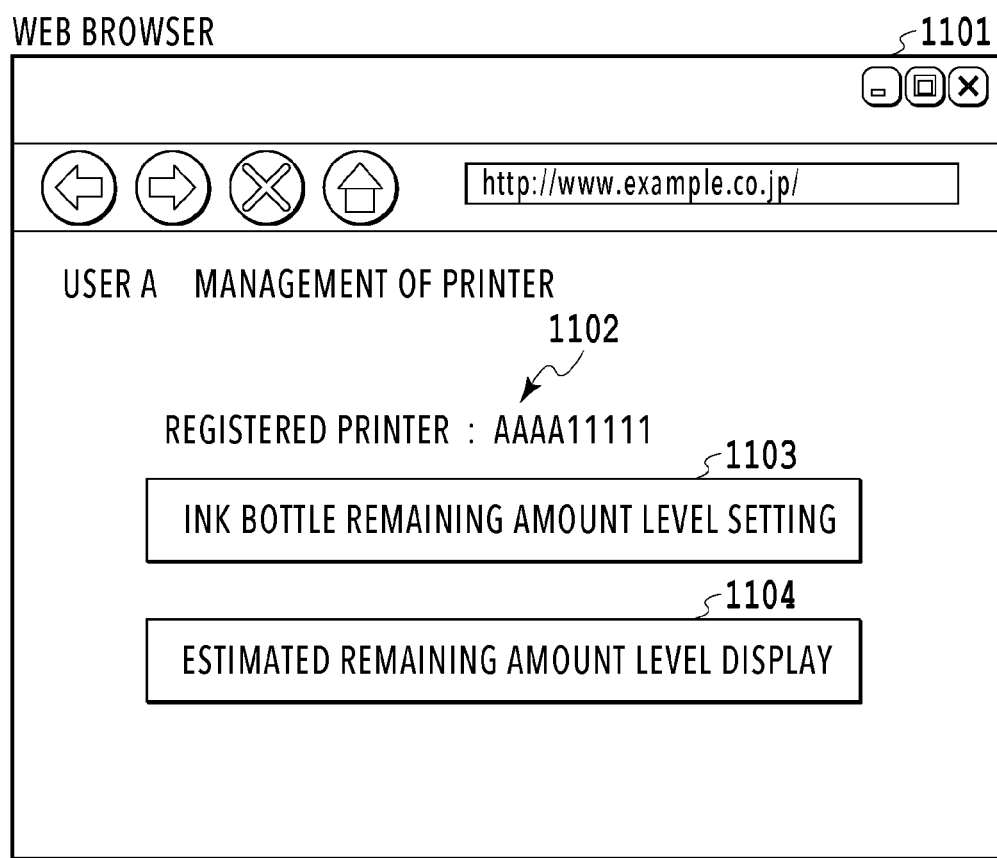
FIG. 11 is a schematic diagram of a management page of a printer in a second embodiment.

FIG. 11 is a diagram schematically showing a printer management page 1101 that is presented to a user who has joined in the consumable item order service among printer users. The printer management page 1101 is a GUI, specifically, a Web page, and displayed by a Web browser of a PC, a mobile terminal or the like.

On the printer management page 1101, a serial number 1102 of the printer 103 registered to the service is displayed. Further, the printer management page 1101 has an ink bottle remaining amount level setting button 1103 that a user presses down at the time of setting an ink bottle remaining amount level and an estimated remaining amount level display button 1104 that a user presses down at the time of displaying an ink bottle estimated remaining amount level. The ink bottle remaining amount level in the present embodiment is a numerical value of a ratio in a case where the ink bottle maximum capacity (assumed to be 100) is taken as a reference.

Figure 12:
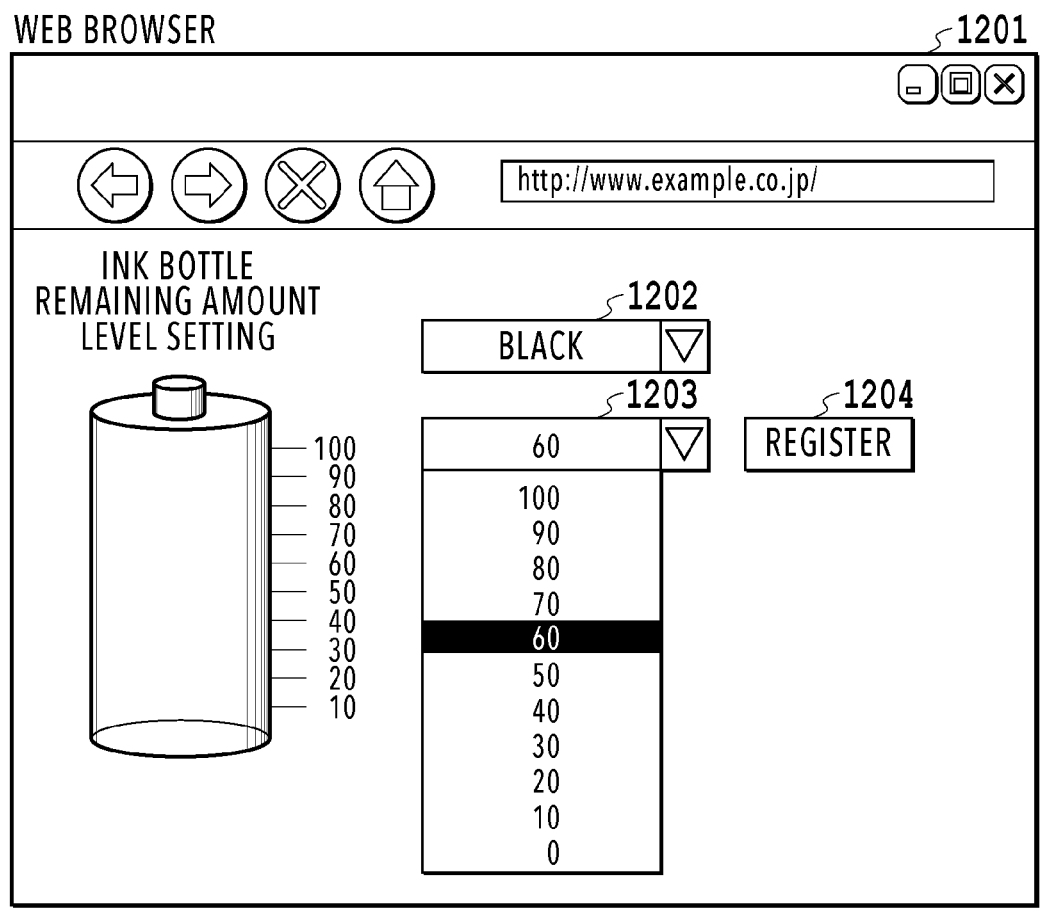
FIG. 12 is a schematic diagram of an ink bottle remaining amount level setting page in the second embodiment.

FIG. 12 is a diagram schematically showing a page for the side of a printer user to set an ink bottle remaining amount level stored in the management server 101, that is, an ink bottle remaining amount level setting page 1201. The ink bottle remaining amount level setting page 1201 is a page that the dealer server 102 displays via a Web browser of a PC, a mobile terminal or the like in a case where the ink bottle remaining amount level setting button 1103 is pressed down by a user. The ink bottle remaining amount level setting page 1201 has an ink bottle color selection field 1202, an ink bottle remaining amount level selection field 1203, and an ink bottle remaining amount registration button 1204.

It is possible for a user to select one ink color from among a plurality of ink colors (in this example, four colors of Cyan, Yellow, Magenta, Black) with which the printer 103 is compatible via the ink bottle color selection field 1202. Further, it is possible for a user to select a value from 0 to 100 at ten levels via the ink bottle remaining amount level selection field 1203. The value 100 indicates the state where the ink bottle remaining amount is full and 0 indicates the empty state. Further, in a case where the ink bottle remaining amount registration button 1204 is pressed down by a user, the CPU 201 of the dealer server 102 transmits the serial number of the printer 103 and various kinds of information on the color of the ink bottle and the remaining amount level to the management server 101.

<Updating Processing of Ink Bottle Ink Consumption Amount>

Figure 13:
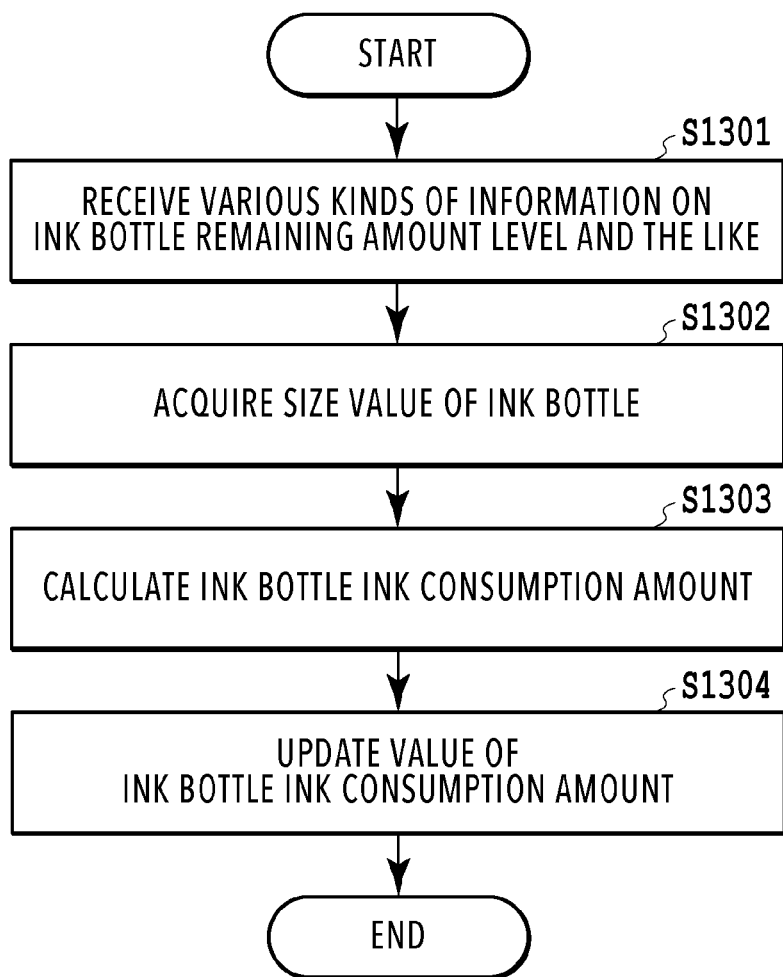
FIG. 13 is a flowchart of updating processing of an ink consumption amount in an ink bottle in the second embodiment.

In the following, updating processing of an ink bottle ink consumption amount in the present embodiment is explained by using FIG. 13. FIG. 13 is a flowchart of the updating processing of an ink bottle ink consumption amount. The processing at each step in FIG. 13 is performed by the CPU 201 of the management server 101 loading a program code stored in the ROM 203 or the storage device 204 onto the RAM 202 and executing the program code.

At S1301, the management server 101 receives the serial number of the printer 103 and the various kinds of information on the color of the ink bottle and the remaining amount level, which are transmitted by the dealer server 102.

At S1302, the CPU 201 of the management server 101 first acquires the model number information on the target-color ink bottle by searching the ink model number table 902 using the serial number of the printer 103 acquired at S1301. Next, the CPU 201 of the management server 101 acquires the size value of the ink bottle corresponding to the target-color model number from the ink bottle master table 905 by referring to the ink bottle master table 905. For example, in a case where the target-color model number is ABC-<Bk>L, 500 is acquired as the size value.

At S1303, the CPU 201 of the management server 101 calculates the ink bottle ink consumption amount. In detail, the CPU 201 of the management server 101 first finds the ink bottle consumption level by using the ink bottle remaining amount level information acquired at S1301. The ink bottle consumption level is a value obtained by subtracting the value of the ink bottle remaining amount level from the maximum level 100. For example, in a case where the ink bottle remaining amount level is 60, the ink bottle consumption level is 40. After finding the ink bottle consumption level, the CPU 201 of the management server 101 finds the ink bottle ink consumption amount by multiplying the bottle size value by the ink bottle consumption level. For example, in a case where the bottle size value is 500 and the ink bottle consumption level is 40, it is possible to calculate the ink bottle ink consumption amount as 200 (500×40÷100).

At S1304, the CPU 201 of the management server 101 updates the value of the ink bottle ink consumption amount within the ink bottle consumption amount table 903.

<Estimated Remaining Amount Level Display Processing>

Figure 15:
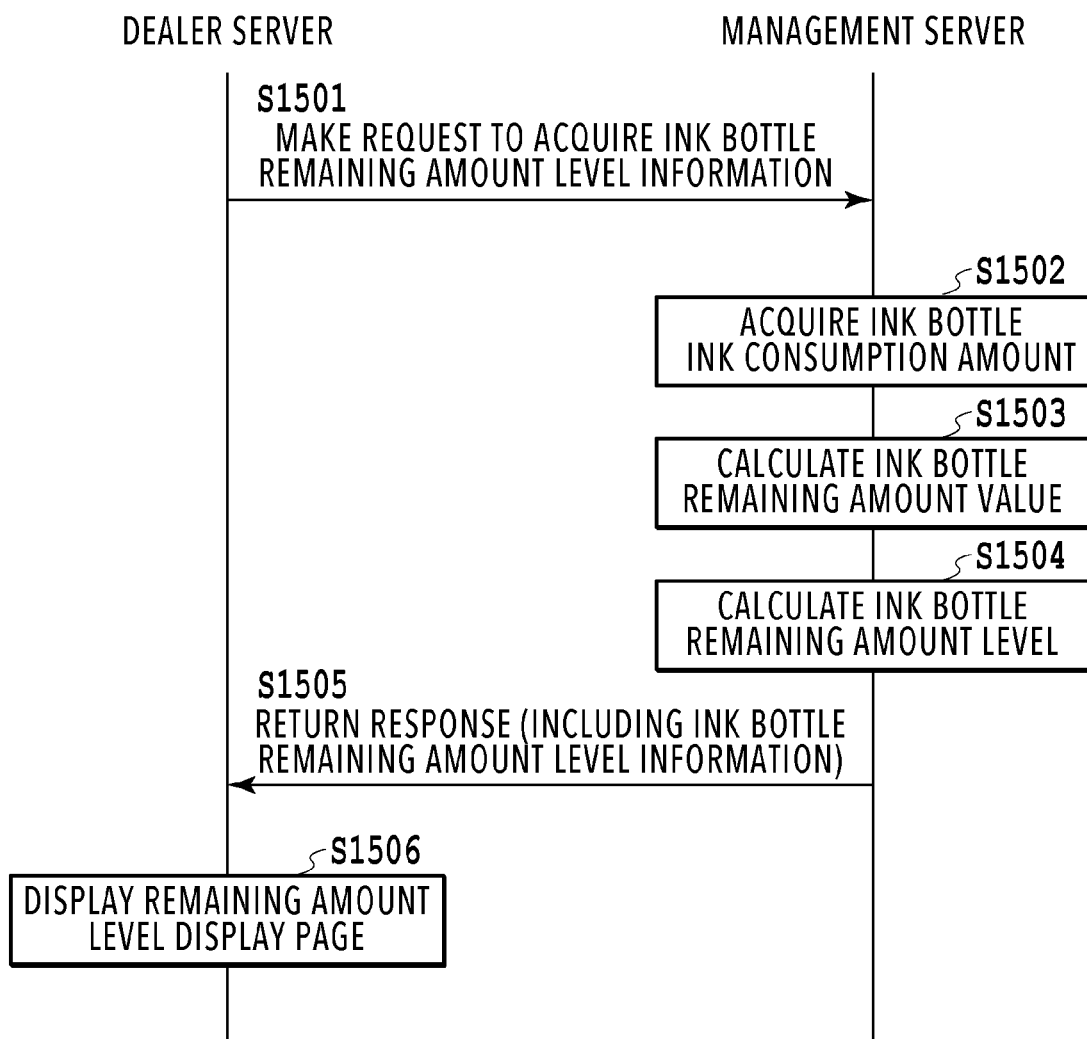
FIG. 15 is a sequence diagram of estimated remaining amount level display processing in the second embodiment.

FIG. 15 is a sequence diagram showing an example of processing that is performed by the dealer server 102 and the management server 101 at the time of the dealer server 102 displaying an ink bottle estimated remaining amount level. The series of processing shown in the sequence in FIG. 15 is performed by each CPU of the management server 101 and the dealer server 102 loading a program code stored in the disk device or the like onto the RAM and executing the program code. Alternatively, it may also be possible to implement part or all of the functions at the steps in FIG. 15 by hardware, such as an ASIC or an electronic circuit.

In a case of detecting pressing down of the estimated remaining amount level display button 1104, the dealer server 102 transmits a request to acquire information indicating the ink bottle remaining amount level to the management server 101 at S1501. In the acquisition request that is transmitted at this step, information on the serial number of the printer 103 and the like is included.

At S1502, the management server 101 acquires the ink bottle ink consumption amounts for all the ink colors with which the printer is compatible by searching the ink bottle consumption amount table 903 using the serial number of the printer 103 acquired at S1501.

At S1503, the management server 101 first acquires the ink bottle model number information about all the ink colors with which the printer is compatible by searching the ink model number table 902 using the serial number of the printer 103. Next, the management server 101 acquires the ink bottle size information (size values) about all the ink colors by searching the ink bottle master table 905 using the acquired ink bottle model number information. Next, the management server 101 finds the ink bottle remaining amount value for each ink color based on the acquired ink bottle size information and the ink bottle ink consumption amount acquired at S1502. For example, in a case where the ink bottle size value is 500 and the ink bottle ink consumption amount is 300, the ink bottle remaining amount value is 200.

At S1504, the management server 101 calculates the ink bottle remaining amount level. Specifically, the management server 101 finds a ratio of the ink bottle remaining amount value to the ink bottle size value and takes the value of the ratio as the ink bottle remaining amount level. For example, in a case where the ink bottle size value is 500 and the ink bottle remaining amount value is 300, the ink bottle remaining amount level is 60 (=300/500×100). The calculation of the ink bottle remaining amount level at this step is performed for all the ink colors.

At S1505, the management server 101 returns a response that is in accordance with the acquisition request for information on the ink bottle remaining amount level received at S1501 and in which information on the ink bottle remaining amount levels of all the ink colors is included to the dealer server 102.

At S1506, the dealer server 102 displays a remaining amount level page 1401, to be described later.

Figure 14:
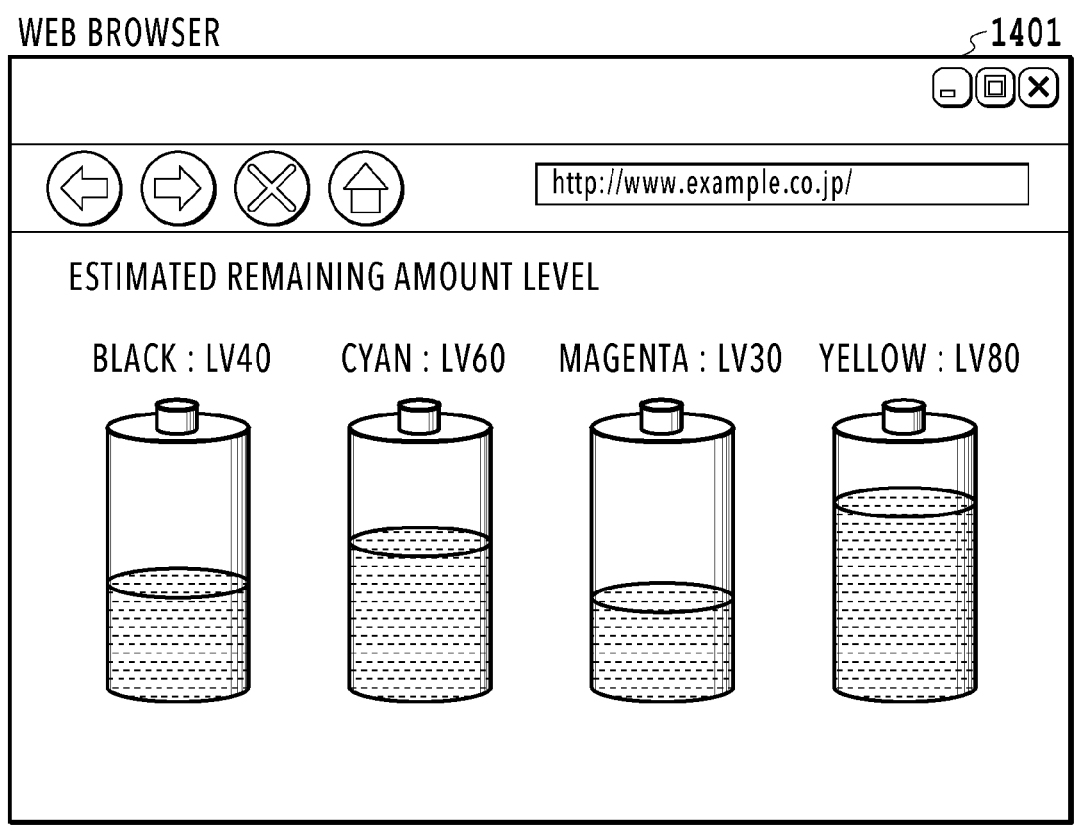
FIG. 14 is a schematic diagram of a remaining amount level display page in the second embodiment.

FIG. 14 is a diagram schematically showing the page (called remaining amount level display page) 1401 for displaying the ink bottle remaining amount level calculated based on the ink bottle ink consumption amount registered in the management server 101. The ink bottle level display page 1401 is a page that the dealer server 102 displays via a Web browser by acquiring information on the ink bottle remaining amount level from the management server 101 in a case where the estimated remaining amount level display button 1104 is pressed down by a user.

<Effects of the Present Embodiment>

According to the system construction in the present embodiment, it is possible for a printer user to check the ink bottle state information managed by the management server 101 and update the ink bottle consumption amount as needed. Consequently, even in a case where a user joins in the consumable item order service after a printer is used to a certain extent, it is possible to register the value indicating the current ink bottle state to the management server 101. Due to this, it is made possible to prevent a case where a user orders an ink bottle in a state where much ink remains in the ink bottle at hand of the user.

Third Embodiment

In the present embodiment, an aspect is explained in which it is possible to adjust the ink bottle ink consumption amount managed by the management server 101 by the operation of the printer 103. In the present embodiment, explanation of the contents in common to those of the embodiments described previously is omitted appropriately and points different from those of the embodiments described previously are explained mainly.

Figure 16:
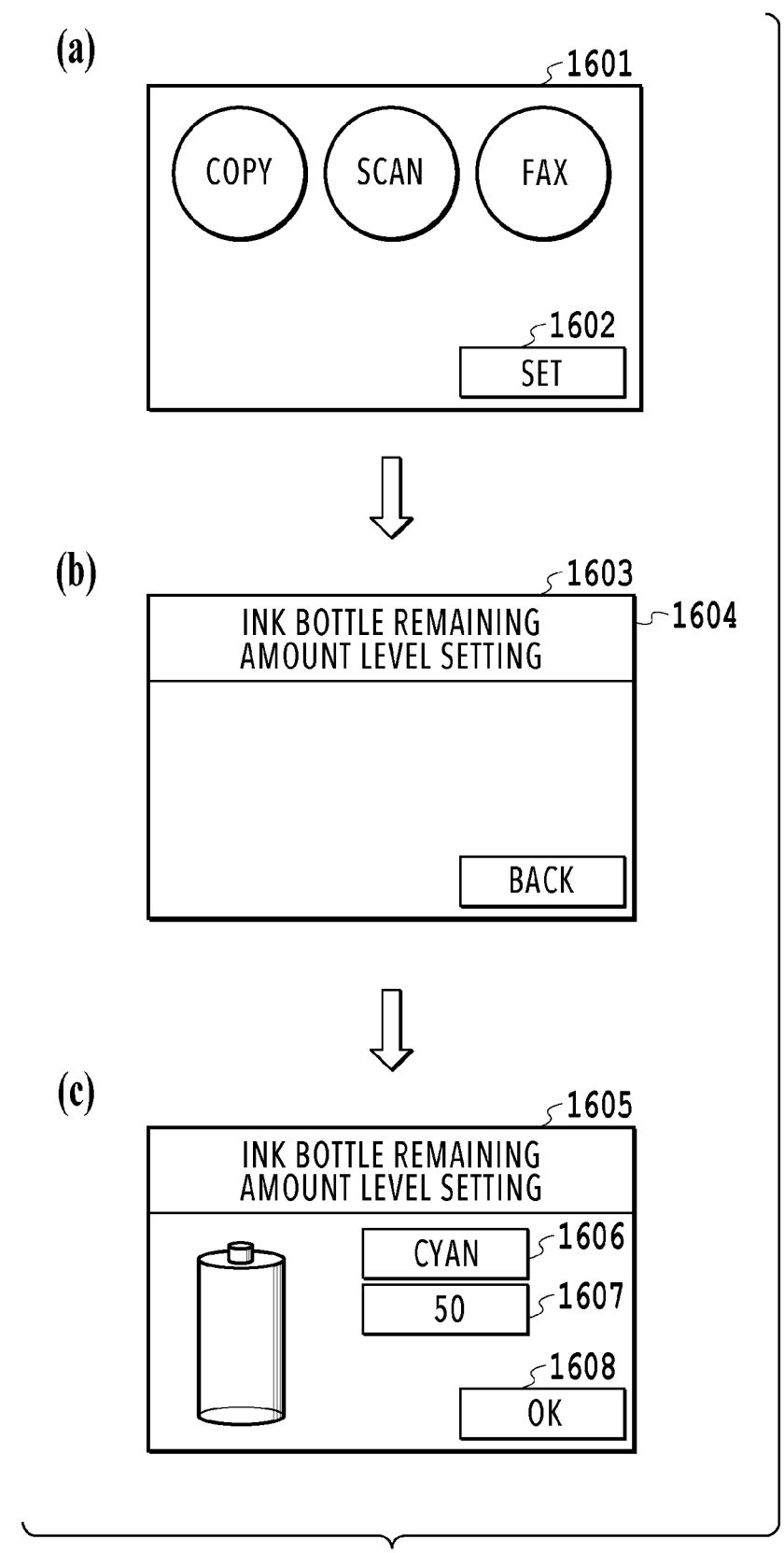
FIG. 16 is a diagram showing a transition of a screen that is displayed on a display unit of a printer in a third embodiment.

FIG. 16 is a diagram showing a transition of the screen that is displayed on the display unit 308 of the printer 103. A symbol (a) of FIG. 16 shows a main screen 1601 that is displayed in a case where the electric power source of the printer 103 is turned on. The main screen 1601 has a Set button 1602. A symbol (b) of FIG. 16 shows a printer setting screen 1603 that is displayed in a case where the Set button 1602 is pressed down. The printer setting screen 1603 has an ink bottle remaining amount level set button 1604.

A symbol (c) of FIG. 16 shows an ink bottle remaining amount level setting screen 1605 that is displayed in a case where the ink bottle remaining amount level setting button 1604 is pressed down. The ink bottle remaining amount level setting screen 1605 has a color selection field 1606 to select the color of an ink bottle, a remaining amount level selection field 1607 to select an ink bottle remaining amount level, and an OK button 1608 to reflect the selected settings.

It is possible for a printer user to select one ink color from among a plurality of ink colors with which the printer 103 is compatible via the color selection field 1606. Further, it is possible for a printer user to select a value from 0 to 100 at ten levels via the remaining amount level selection field 1607. The value 100 indicates the state where the ink bottle remaining amount is full and 0 indicates the empty state. Further, in a case where the OK button 1608 is pressed down by a printer user, the CPU 305 of the printer 103 transmits various kinds of information, such as the selected ink bottle color and the remaining amount level information, to the management server 101

<Effects of the Present Embodiment>

According to the present embodiment, it is made possible for the side of the printer 103 to update the ink bottle ink consumption amount managed by the management server 101.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the present disclosure, it may also be possible to appropriately combine the elements of the embodiments described previously.

According to one embodiment of the present disclosure, it is made possible to appropriately order an ink bottle.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-239142, filed Dec. 27, 2019, which is hereby incorporated by reference herein in its entirety.

What is claimed is:

1. A system comprising:
a printing apparatus; and
a server system comprising one or more servers,
wherein the printing apparatus comprises: (1) an ink tank that stores ink supplied from an ink bottle; (2) a head to which ink is supplied from the ink tank; (3) a detection unit configured to detect an ink remaining amount within the ink tank by using a sensor or by dot count; and (4) a transmission unit configured to transmit status information in which at least information relating to the ink remaining amount within the ink tank is included,
wherein the server system comprises: (1) a reception unit configured to receive the status information; and (2) a first calculation unit configured to calculate an ink consumption amount of the ink bottle by using the status information, and
wherein order processing of a new ink bottle is performed based on an ink consumption amount of the ink bottle.

2. The system according to claim 1, wherein the server system further comprises an order unit configured to perform the order processing of a new ink bottle in a case where an ink consumption amount calculated by the first calculation unit is larger than a predetermined first threshold value.

3. The system according to claim 2, wherein the order unit performs the order processing of a new ink bottle based on the calculated ink consumption amount and an ink bottle order situation.

4. The system according to claim 3, wherein the first calculation unit comprises:
an acquisition unit configured to acquire information on an ink remaining amount within the ink tank, which is included in the status information;

a second calculation unit configured to calculate an ink consumption amount of the ink tank based on the information on an ink remaining amount within the ink tank, which is acquired by the acquisition unit; and a third calculation unit configured to calculate a current ink consumption amount of the ink bottle based on a difference between an ink consumption amount of the ink bottle stored in advance, and an ink consumption amount of the ink tank calculated by the second calculation unit.

5. The system according to claim 4, wherein the first calculation unit further comprises:

a third determination unit configured to determine whether the ink consumption amount calculated by the third calculation unit exceeds a predetermined second threshold value indicating a size of the ink bottle; and a fourth calculation unit configured to recalculate an ink consumption amount of the ink bottle by subtracting an amount corresponding to the size of the ink bottle from the ink consumption amount calculated by the third calculation unit in a case where determination results of the third determination unit are affirmative.

6. The system according to claim 5, wherein the server system further comprises a storage unit configured to store a plurality of tables, and wherein the plurality of tables includes:

(1) a first table in which various kinds of information on a serial number, a consumable item type, and whether or not an order is possible are associated with one another and stored;

(2) a second table in which various kinds of information on a serial number and an ink bottle model number are associated with each other and stored:

(3) a third table in which various kinds of information on a serial number and an ink bottle consumption amount are associated with each other and stored;

(4) a fourth table in which various kinds of information on a serial number and an ink bottle ink remaining amount are associated with each other and stored; and (5) a fifth table in which various kinds of information on an ink bottle model number, the first threshold value, and the second threshold value are associated with one another and stored.

7. The system according to claim 1, wherein the system is constructed so as to enable a user to set a remaining amount level for adjusting an ink consumption amount of the ink bottle managed in the server system via a Web browser.

8. The system according to claim 1, wherein the server system further comprises:

a fifth calculation unit configured to calculate a remaining amount value of the ink bobble; and a sixth calculation unit configured to calculate a remaining amount level of the ink bottle based on the remaining amount value of the ink bottle calculated by the fifth calculation unit.

9. The system according to claim 8, wherein the remaining amount level of the ink bottle calculated by the sixth calculation unit is presented to a user via a Web browser.

* * * * *